United States Patent
Desie et al.

(10) Patent No.: US 7,575,314 B2
(45) Date of Patent: Aug. 18, 2009

(54) DOTSIZE CONTROL FLUID FOR RADIATION CURABLE INK-JET PRINTING PROCESS

(75) Inventors: Guido Desie, Herent (BE); Dirk Quintens, Westerlo (BE)

(73) Assignee: Agfa Graphics, N.V., Mortsel (BE)

( * ) Notice: Subject to any disclaimer, the term of this patent is extended or adjusted under 35 U.S.C. 154(b) by 343 days.

(21) Appl. No.: 11/280,929

(22) Filed: Nov. 16, 2005

(65) Prior Publication Data

US 2006/0132566 A1 Jun. 22, 2006

Related U.S. Application Data

(60) Provisional application No. 60/645,489, filed on Jan. 19, 2005.

(30) Foreign Application Priority Data

Dec. 16, 2004 (EP) ................................. 04106632

(51) Int. Cl.
*G01D 11/00* (2006.01)
(52) U.S. Cl. ......................... 347/100; 347/95; 347/101; 347/105
(58) Field of Classification Search ................. 347/100, 347/95, 96, 101, 105; 428/195, 32.1; 106/31.13, 106/31.6, 31.27; 523/160
See application file for complete search history.

(56) References Cited

U.S. PATENT DOCUMENTS

| | | | |
|---|---|---|---|
| 4,781,985 A | 11/1988 | Desjarlais | |
| 4,857,630 A | 8/1989 | Kim | |
| 4,892,591 A | 1/1990 | Ogawa et al. | |
| 4,902,568 A | 2/1990 | Morohoshi | |
| 5,073,488 A | 12/1991 | Vieira et al. | |
| 5,084,340 A | 1/1992 | Light | |
| 5,085,689 A | 2/1992 | Kast et al. | |
| 5,196,502 A | 3/1993 | Turner et al. | |
| 5,285,064 A | 2/1994 | Willoughby | |
| 5,389,133 A | 2/1995 | Gundlach et al. | |
| 5,443,628 A | 8/1995 | Loria et al. | |
| 5,538,548 A | 7/1996 | Yamazaki | |
| 5,618,338 A * | 4/1997 | Kurabayashi et al. | 347/100 |
| 5,624,428 A | 4/1997 | Sauer | |
| 5,713,993 A | 2/1998 | Grezzo et al. | |
| 5,720,802 A | 2/1998 | Wong et al. | |
| 5,969,002 A | 10/1999 | Kijlstra et al. | |
| 6,238,047 B1 | 5/2001 | Suzuki et al. | |
| 6,720,042 B2 | 4/2004 | Ylitalo et al. | |
| 2003/0021961 A1 | 1/2003 | Ylitalo et al. | |
| 2003/0054139 A1 | 3/2003 | Ylitalo et al. | |
| 2003/0224128 A1 | 12/2003 | Ylitalo et al. | |
| 2004/0003093 A1 | 1/2004 | Kamath | |
| 2004/0126507 A1 | 7/2004 | O'Brien | |
| 2004/0258856 A1 | 12/2004 | Ylitalo et al. | |

FOREIGN PATENT DOCUMENTS

| | | |
|---|---|---|
| DE | 19 636 382 A1 | 3/1998 |
| EP | 0 259 130 A2 | 3/1988 |
| EP | 0 373 573 A1 | 6/1990 |
| EP | 0 423 829 A1 | 4/1991 |
| EP | 0 429 828 A1 | 6/1991 |
| EP | 0 487 350 A1 | 5/1992 |
| EP | 0 493 100 A1 | 7/1992 |
| EP | 0 526 198 A1 | 7/1992 |
| EP | 0 500 021 A1 | 8/1992 |
| EP | 0 514 633 A1 | 11/1992 |
| EP | 0 622 244 A1 | 11/1994 |
| EP | 0 634 286 A1 | 1/1995 |
| EP | 0 742 108 A1 | 5/1996 |
| EP | 0 776 952 A2 | 6/1997 |
| EP | 0 810 101 A1 | 12/1997 |
| EP | 1 199 181 A2 | 4/2002 |
| EP | 1 671 804 A1 | 6/2006 |
| GB | 2303376 A1 | 2/1997 |
| JP | 62 280 068 A | 12/1987 |
| WO | WO 97/47480 A | 12/1997 |
| WO | WO 03/080356 A1 | 10/2003 |
| WO | WO 03/101747 A1 | 12/2003 |
| WO | WO 2004/003093 A1 | 1/2004 |

OTHER PUBLICATIONS

European Search Report in 04 10 662 (Jun. 30, 2005).
Crivello, J.V., et al.; "Photoinitiators for Free Radical Cationic & Anionic Photopolymerization;" $2^{nd}$ Edition; pp. 287-294 (1998).
Mc Cutcheon; *Functional Material*; North American Edition; pp. 110-129 (1990).

* cited by examiner

*Primary Examiner*—Manish S Shah
(74) *Attorney, Agent, or Firm*—Leydig, Voit & Mayer, Ltd.

(57) ABSTRACT

A radiation curable ink-jet printing process is disclosed, exhibiting consistent image quality on a wide variety of different ink-receivers. The ink-jet printing process includes the steps of:
a) providing an ink-receiver;
b) providing a surface layer on at least a portion of the ink-receiver with a dotsize control fluid;
c) jetting at least one radiation curable ink-jet ink droplet to the surface layer on the ink-receiver;
characterized in that the dotsize control fluid contains a surfactant, a film forming polymeric resin and an inorganic filler, wherein the ratio P/F is greater than 3.0, with P being the weight % of film forming polymeric resin and F being the weight % of inorganic filler, both based on the total weight of the dotsize control fluid, and the surfactant is present in the surface layer in the range of 0.1 to 20% by weight based on the total dry weight of the surface layer.

19 Claims, No Drawings

DOTSIZE CONTROL FLUID FOR RADIATION CURABLE INK-JET PRINTING PROCESS

CROSS-REFERENCE TO RELATED PATENT APPLICATIONS

This application claims the benefit of U.S. Provisional Application No. 60/645,489 filed Jan. 19, 2005, which is incorporated by reference. In addition, this application claims the benefit of European Application No. 04106632 filed Dec. 16, 2004, which is also incorporated by reference.

TECHNICAL FIELD

The present invention relates to a radiation curable ink-jet printing process exhibiting consistent image quality on different ink-receivers.

BACKGROUND ART

In ink-jet printing tiny drops of ink fluid are projected directly onto an ink-receiver surface without physical contact between the printing device and the ink-receiver. The printing device stores the printing data electronically and controls a mechanism for ejecting the ink drops image-wise onto the ink-receiver. Printing can be accomplished by moving a print head across the ink-receiver or vice versa.

The jetting of the ink droplets can be performed in several different ways. In a first type of process called continuous ink-jet printing, the ink stream jetted from an orifice of the print head is broken up, by applying a pressure wave pattern to this orifice, into ink droplets of uniform size and spacing, which can be electrostatically charged or not as desired. In one embodiment the charged drops are deflected by an electric field into a gutter for recuperation, while the uncharged drops are undeflected and land on the ink-receiver to form an image. In an alternative embodiment it is the charged droplets which land on the ink-receiver to form an image and it are the uncharged droplets, which are recuperated.

According to a second process the ink droplets can be created by a "drop on demand" method (DOD). A drop-on-demand device ejects ink droplets only when they are needed for imaging on the ink-receiver, thereby avoiding the complexity of drop charging, deflection hardware, and ink collection. In drop-on-demand ink-jet printing, the ink droplet can be formed by means of a pressure wave created by a mechanical motion of a piezoelectric transducer (so-called "piezo method"), or by means of discrete thermal pushes (so-called "bubble jet" method, or "thermal jet" method).

The ink fluids can be roughly divided into:
water based, the drying mechanism involving absorbance, penetration and evaporation;
oil based, the drying involving absorbance and penetration;
solvent based, the drying mechanism involving penetration but primarily evaporation;
hot melt or phase change, in which the ink is liquid at the ejection temperature but solid at room temperature and wherein drying is replaced by solidification;
radiation curable, in which drying is replaced by polymerization.

Water based, oil based and solvent based inks are jetted on ink-receivers, which typically contain either one or more porous layers that imbibe the ink via capillary action, or one or more polymer layers that swell to absorb the ink. Hot melt and radiation curable inks are usually jetted on substantially non-absorbing ink-receivers. Hot melt inks are limited to thermally stable ink-receivers, while radiation curable inks can be jetted on a wide variety of ink-receivers.

The main problem of radiation curable inks is that the image quality tends to change with the selection of the ink-receiver. In particular, the spreading of the ink droplet on the ink-receiver is highly dependent on the type of ink-receiver chosen.

One method to obtain a consistent image quality with a wide variety of ink-receivers would be to adapt the ink-jet ink set each time to the chosen ink-receiver. However, changing inks in printer and printhead is very time consuming and not really a viable solution for an industrial printing environment. Therefore, the general approach is to modify the surface chemistry either with a suitable surface layer coating or by pre-treatment, i.e. plasma, corona, flame treatment. Surface coatings can be either absorbing or non-absorbing.

The surface treatment in EP 1199181 A (TOYO INK) consists of a corona treatment or a plasma treatment.

EP 1199181 A (TOYO INK) discloses a method for ink-jet printing on a surface of a substrate of a synthetic resin, said method comprising the steps of:
1. conducting a surface treatment to said surface so as to provide the surface with a specific surface free energy of 65-72 mJ/m$^2$
2. providing an activation energy beam curable ink having a surface tension of 25-40 mN/m
3. discharging the ink onto the surface having the specific surface free energy with an ink-jet printing device thereby forming printed portions of said ink on the surface and
4. projecting an activation energy beam onto the printed portions.

Corona discharge treatment is one of the most commonly used methods for activating a plastic surface prior to forming an adhesive bond. Corona discharges are produced from point sources, and as such produce localised energetic discharges, which are commonly known as streamers. The production of localised energetic discharges often result in a non-uniform treatment of the substrate and hence a non-uniform image quality. Corona treatment has the advantage of working well with newly manufactured substrates. However, recycled substrates may contain significant impurities or irregularities that may interfere with the treatment of the substrate.

Plasma treatment infuses the treatment zone with an inert gas that is partially ionized by the energized electrodes. While plasma treatment may provide enhanced adhesion in certain applications, a special inert gas or gas mixture and a complex control mechanism are required to realize plasma treatment. This increases the cost, complexity and maintenance of the equipment used to process the substrates. Thus, it is desirable to avoid the plasma treatment process where possible.

The other possibility for using the same ink-jet ink set on different ink-receivers is the application of a surface layer just prior to jetting the radiation curable ink.

WO 03101747 (DELAWARE CAPITAL FORMATION) discloses a method of selecting a coating to provide a surface to which inkjet ink adheres with a selectable and substantially consistent texture and gloss across the surface of a non-inkjet ready substrate comprising:
determining a desired adherence of the ink to the coating;
determining a desired finish.

The dot quality clearly differs, in five of the six cases, on the three different substrates provided with the same coating. The nature of the ink-jet ink is not disclosed.

U.S. Pat. No. 6,720,042 (3M) discloses an article comprising:
a) a sheet having a primed surface portion; and b) a radiation cured ink jetted image derived from an ink composition comprising at least 25 weight percent of at least one radiation curable monomer disposed on said primed surface portion;

wherein the article is durable for outdoor usage.

In U.S. Pat. No. 6,720,042 (3M), the range of suitable radiation curable inks is limited to inks which contain at least 25 weight percent of a monofunctional monomer functioning as a diluent or solvent. Also the primer thickness is critical to achieve an optimal compromise between dot gain and adhesion.

US 20030224128 A (3M) discloses a method of printing a non-aqueous ink comprising:
a) providing a substrate comprising a primed surface of thickness $t_1$;
b) printing a non-aqueous ink on said primed surface, said ink having a theoretical dry thickness $t_2$ and an actual dry thickness $t_3$;
wherein $t_3$ is greater than $t_2$ by an amount ranging from about 25% of $t_1$ to an amount about equal to the sum of $t_2$ and $t_1$.

Again the range of suitable inks in US 20030224128 A (3M) is limited. The ink-jet ink must contain an organic solvent capable of at least partially dissolving the primed layer. The application is silent on radiation curable inks, which is also the case for the solvent-based inks jetted on a primed substrate of WO 03080356 (UCB) and WO 2004003093 (UCB).

US 20040126507 A (EXXON MOBIL) discloses a substrate printed with a radiation cured inkjet printed image wherein the image is printed on a coating on the substrate and wherein the coating comprises a copolymer derived from a carboxylic acid containing vinylic unsaturation. The examples fail to teach how to achieve minimal differences in drop spread with the same coating on different substrates, e.g. DIGI-LYTE Film 65 (very little spread) and LABEL-LYTE Film 70 (excessive spread).

Although surface property modification by either coating or pre-treatment techniques has been widely employed, the exact nature of the ink-media interaction is not fully understood. Attempts are typically made to correlate the print quality to measurable surface parameters such as surface energy and surface roughness, but these parameters do not fully capture the behaviour of ink droplets on various media.

Therefore, it would be desirable to have an ink-jet printing process capable of producing approximately the same dotsize with the same radiation curable ink droplet volume on a wide variety of ink receivers provided with a surface layer of a fluid and wherein the thickness of the surface layer is not critical. The radiation curable inks should not be restricted to certain specific inks having enough organic solvent or monofunctional monomers present.

OBJECTS OF THE INVENTION

It is an object of the present invention to provide an ink-jet printing process producing approximately the same dotsize with the same radiation curable ink-jet ink droplet volume on a wide variety of ink receivers provided with a surface layer, and wherein the thickness of the surface layer is not critical.

It is an another object of the present invention to provide an ink-jet printing process producing approximately the same dotsize with the same radiation curable ink-jet ink droplet volume on a wide variety of ink receivers, wherein the radiation curable ink-jet ink may be free of organic solvent.

These and other objects of the invention will become apparent from the description hereinafter.

SUMMARY OF THE INVENTION

It was surprisingly found that a dotsize control fluid comprising film forming polymeric resin and inorganic filler in a certain ratio lead to a ink-jet printing process, wherein the differences in dotsize on different ink-receivers provided with a surface layer of this dot control fluid was minimalized to less than 30 µm.

Objects of the present invention are realized by an ink-jet printing process comprising the steps of:
a) providing an ink-receiver;
b) providing a surface layer on at least a portion of said ink-receiver with a dotsize control fluid;
c) jetting at least one radiation curable ink-jet ink droplet to said surface layer on said ink-receiver;
characterized in that said dotsize control fluid contains a surfactant, a film forming polymeric resin and an inorganic filler, wherein the ratio P/F is greater than 3.0,
with P being the weight % of film forming polymeric resin and F being the weight % of inorganic filler, both based on the total weight of the dotsize control fluid, and
said surfactant is present in said surface layer in the range of 0.1 to 20% by weight based on the total dry weight of the surface layer.

Further advantages and embodiments of the present invention will become apparent from the following description.

DETAILED DESCRIPTION OF THE INVENTION

Definitions

The term "actinic radiation" as used in disclosing the present invention, means electromagnetic radiation capable of initiating photochemical reactions.

The term "ultraviolet radiation" as used in disclosing the present invention, means electromagnetic radiation in the wavelength range of 4 to 400 nanometers.

The term "UV" is used in disclosing the present application as an abbreviation for ultraviolet radiation.

The term "DCF" is used in disclosing the present application as an abbreviation for dot control fluid.

The term "initiator" as used in disclosing the present invention, means a Norrish type I initiator, a Norrish type II initiator or a photo-acid generator.

The term "Norrish Type I initiator" as used in disclosing the present invention, means an initiator which cleaves after excitation, yielding the initiating radical immediately.

The term "Norrish Type II initiator" as used in disclosing the present invention, means an initiator which is activated by actinic radiation and forms free radicals by hydrogen abstraction or electron extraction from a second compound that becomes the actual initiating free radical.

The term "photo-acid generator" as used in disclosing the present invention, means an initiator which generates a photo-acid or hemi-acid upon exposure to actinic radiation.

The term "colorant", as used in the present invention means dyes and pigments.

The term "dye", as used in the present invention means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

The term "filler", as used in the present invention means an inorganic material added to a layer on an ink-receiver to modify its properties, e.g. adhesion, opacity or tribo-electrical properties.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "acyl group" means —(C=O)-aryl and —(C=O)-alkyl groups.

The term "aliphatic group" means saturated straight chain, branched chain and alicyclic hydrocarbon groups.

The term "unsaturated aliphatic group" means straight chain, branched chain and alicyclic hydrocarbon groups which contain at least one double or triple bond.

The term "aromatic group" as used in disclosing the present invention means an assemblage of cyclic conjugated carbon atoms, which are characterized by large resonance energies, e.g. benzene, naphthalene and anthracene.

The term "alicyclic hydrocarbon group" means an assemblage of cyclic conjugated carbon atoms, which do not form an aromatic group, e.g. cyclohexane.

The term "substituted" as used in disclosing this present invention means that one or more of the carbon atoms and/or that a hydrogen atom of one or more of carbon atoms in an aliphatic group, an aromatic group or an alicyclic hydrocarbon group, are replaced by an oxygen atom, a nitrogen atom, a silicon atom, a sulphur atom, a phosphorous atom, selenium atom or a tellurium atom. Such substituents include hydroxyl groups, ether groups, carboxylic acid groups, ester groups, amide groups and amine groups.

The term "heteroaromatic group" means an aromatic group wherein at least one of the cyclic conjugated carbon atoms is replaced a nitrogen atom or a phosphorous atom.

The term "heterocyclic group" means an alicyclic hydrocarbon group wherein at least one of the cyclic conjugated carbon atoms is replaced by an oxygen atom, a nitrogen atom, a phosphorous atom, a silicon atom, a sulphur atom, a selenium atom or a tellurium atom.

Dotsize Control Fluid

A dotsize control fluid suitable for the ink-jet printing process according to the present invention contains at least four components: (i) a film forming polymeric resin, (ii) an inorganic filler, (iii) a surfactant and (iv) a solvent.

The dotsize control fluid suitable for the ink-jet printing process according to the present invention has a P/F ratio greater than 3, with P the weight % of film forming polymeric resin and F the weight % of inorganic filler, both based on the total weight of the dotsize control fluid. In a preferred embodiment the P/F ratio is between 3 and 500, more preferably between 4 and 250 and most preferably between 5 and 148.

The dotsize control fluid suitable for the ink-jet printing process according to the present invention may contain one or more dispersants.

The dotsize control fluid suitable for the ink-jet printing process according to the present invention may contain one or more biocides.

The dotsize control fluid suitable for the ink-jet printing process according to the present invention may further contain one or more other additives required to optimize the coating quality of the surface layer or to improve the jetting quality of the dotsize control fluid.

The dotsize control fluid suitable for the ink-jet printing process according to the present invention may be coated, sprayed or jetted onto an ink-receiver. The dotsize control fluid is preferably applied onto the ink-receiver by ink-jet technology and may by jetted only onto a portion of an ink-receiver intended to carry a radiation curable image. The inorganic particles should then be sufficiently small to permit free flow through the ink-jet printing device, especially at the ejecting nozzles which usually have a diameter ranging from 10 µm to 50 µm.

The dotsize control fluid is applied onto the ink-receiver in an amount preferably between 0.1 and 10 $g/m^2$ and particular preferably between 0.1 and 5 $g/m^2$. The dry thickness of the surface layer is preferably between 0.1 and 10 µm, and particularly preferably between 0.1 and 5 µm, most preferably between 0.1 and 1.5 µm.

In one embodiment the dotsize control fluid is used in an ink-jet printing process comprising the steps of:
a) providing a surface layer on at least a portion of a first ink-receiver with a dotsize control fluid containing a film forming polymeric resin and an inorganic filler, wherein the ratio P/F is greater than 3.0, with P the weight % of film forming polymeric resin and F the weight % of inorganic filler, both based on the total weight of the dotsize control fluid;
b) providing a surface layer on at least a portion of a second ink-receiver with the dotsize control fluid, wherein the second ink-receiver differs in chemical composition from the first ink-receiver; and
c) jetting at least one radiation curable ink-jet ink droplet to the surface layer on the first and second ink-receivers;
characterized in that for the same radiation curable ink-jet ink droplet volume, the dot size on the first ink-receiver and the second ink-receiver differs by not more than 30 µm.

In another embodiment, the dotsize control fluid is used in an ink-jet printing process comprising the steps of:
a) providing a surface layer on at least a portion of a first ink-receiver with a dotsize control fluid containing a film forming polymeric resin and an inorganic filler, wherein the ratio P/F is greater than 3.0,
with P the weight % of film forming polymeric resin and F the weight % of inorganic filler, both based on the total weight of the dotsize control fluid;
b) providing a surface layer on at least a portion of a second ink-receiver with the dotsize control fluid, wherein the second ink-receiver differs in chemical composition from the first ink-receiver; and
c) jetting at least one radiation curable ink-jet ink droplet to the surface layer on the first and second ink-receivers, wherein the dot size on the first ink-receiver and the second ink-receiver divided by the radiation curable ink-jet ink droplet volume differs by not more than 0.7 µm/pL.

Film Forming Polymeric Resin

The dotsize control fluid suitable for the ink-jet printing process according to the present invention comprises at least one film forming polymeric resin. In a preferred embodiment two or more film forming polymeric resins may be used to further improve some properties of the surface layer, e.g. jettability, coating quality or adhesion.

Suitable film forming polymeric resins include organic particles such as polystyrene and polymethyl methacrylate; silicones; melamine-formaldehyde condensation polymers; urea-formaldehyde condensation polymers; polyesters; polyurethanes; polyesterurethanes; polyamides; copolymers of vinylidene chloride such as vinylidene chloride/acrylonitrile/acrylic acid terpolymers or vinylidene chloride/methyl acrylate/itaconic acid terpolymers; homopolymers and copolymers of acrylates, methacrylates, vinylhalogenides, vinylacetate, styrene, acrylonitrile, olefines; cellulose and derivatives thereof; gelatin; polysaccharides; rubber like polymers based on butadienene and isoprene.

Suitable film forming polymeric resins are producible with monomers selected from the group consisting of acrylates, methacrylates, vinyl esters, acrylic acid, methacrylic acid, itaconic acid, vinylidene chloride, polyisocyanates, aromatic polycarboxylic acids and polyols.

The film forming polymeric resins preferably has an average particle size smaller than 1 μm, more preferably smaller than 300 nm, and particularly preferably smaller than 100 nm.

The polymeric resin content in the dotsize control fluid is preferably controlled to give a viscosity of less than 50 mPa·s, preferably less than 30 mPa·s, and more preferably less than 10 mPa·s at a shear rate of 100 s$^{-1}$.

The polymeric resin content in the dotsize control fluid is preferably between 1 and 13 wt %, more preferably between 1.3 and 11 wt % all based on the total weight of the dotsize control fluid.

Inorganic Filler

The dotsize control fluid suitable for the ink-jet printing process according to the present invention comprises at least one inorganic filler, which can be chosen from neutral, anionic and cationic filler types.

Useful fillers include e.g. silica, talc, clay, hydrotalcite, kaolin, diatomaceous earth, calcium carbonate, magnesium carbonate, basic magnesium carbonate, aluminosilicate, aluminum trihydroxide, aluminum oxide (alumina), titanium oxide, zinc oxide, barium sulfate, calcium sulfate, zinc sulfide, satin white, alumina hydrate such as boehmite, zirconium oxide or mixed oxides.

In a preferred embodiment two or more inorganic fillers may be used to further improve some properties of the surface layer, e.g. coating quality and adhesion.

The inorganic filler preferably has an average particle size smaller than 0.8 μm, more preferably smaller than 150 nm and most preferably smaller than 20 nm.

The inorganic filler preferably has a specific surface greater than 50 m$^2$/g, more preferably greater than 200 m$^2$/g, and most preferably greater than 300 m$^2$/g.

If the inorganic filler is a cationic type filler, it is preferably selected from alumina hydrates, aluminum oxides, aluminum hydroxides, aluminum silicates, and cationically modified silica's.

A preferred type of alumina hydrate is crystalline boehmite, or Y-AlO(OH). Useful types of boehmite include, in powder form, DISPERAL, DISPERAL HP14 and DISPERAL 40 from SASOL, MARTOXIN VPP2000-2 and GL-3 from MARTINSWERK GmbH.; liquid boehmite alumina systems, e.g. DISPAL 23N4-20, DISPAL 14N-25, DISPERAL AL25 from SASOL. Patents on alumina hydrate include EP 500021 A (ASAHI GLASS), EP 634286 A (ASAHI GLASS), U.S. Pat. No. 5,624,428 (KIMBERLY CLARK), EP 742108 A (ASAHI GLASS), U.S. Pat. No. 6,238,047 (ASAHI GLASS), EP 622244 A (CANON) and EP 810101 A (CANON).

Suitable cationic aluminum oxide (alumina) types for the dotsize control fluid for use in the ink-jet printing process according to the present invention include α-Al$_2$O$_3$ types, such as NORTON E700, available from SAINT-GOBAIN CERAMICS & PLASTICS INC., and Y-Al$_2$O$_3$ types, such as ALUMINUM OXID C from DEGUSSA; other aluminum oxide grades, such as BAIKALOX CR15 and CR30 from BAIKOWSKI CHEMIE; DURALOX grades and MEDIALOX grades from BAIKOWSKI CHEMIE, BAIKALOX CR80, CR140, CR125, B105CR from BAIKOWSKI CHEMIE; CAB-O-SPERSE PG003™ available from CABOT, CATALOX GRADES and CATAPAL GRADES available from SASOL, such as PLURALOX HP14/150; colloidal Al$_2$O$_3$ types, such as ALUMINASOL™ 100; ALUMINASOL™ 200, ALUMINASOL™ 220, ALUMINASOL™ 300, and ALUMINASOL™ 520 available from NISSAN CHEMICAL INDUSTRIES or NALCO™ 8676 available from ONDEO NALCO.

Other useful cationic inorganic fillers include aluminum trihydroxides such as Bayerite, or α-Al(OH)$_3$, such as PLURAL BT, available from SASOL, and Gibbsite, or Y-Al(OH)$_3$, such as MARTINAL™ grades from MARTINSWERK GmbH, MARTIFIN™ grades, such as MARTIFIN™ OL104, MARTIFIN™ OL 107 and MARTIFIN™ OL111 from MARTINSWERK GmbH, MICRAL™ grades, such as MICRAL™ 1440, MICRAL™ 1500; MICRAL™ 632; MICRAL™ 855; MICRAL™ 916; MICRAL™ 932; MICRAL™ 932CM; MICRAL™ 9400 from JM HUBER COMPANY; HIGILITE™ grades, e.g. HIGILITE™ H42 or HIGILITE™ H43M from SHOWA DENKA K.K.

Another suitable type of cationic filler for the dotsize control fluid according to the present invention is a zirconium oxide such as NALCO™ OOSS008 available from ONDEO NALCO, an acetate stabilized ZrO$_2$ such as ZR20/20, ZR50/20, ZR100/20 and ZRYS4 trademarks from NYACOL NANO TECHNOLOGIES.

Suitable mixed oxides for the dotsize control fluid according to the present invention according to the present invention include SIRAL grades from SSASOL, colloidal metal oxides from NALCO such as NALCO™ 1056, NALCO™ TX10496, NALCO™ TX11678.

The most preferred type of inorganic filler is silica, which can be used as such in its anionic form or after cationic surface modification. Silica is disclosed as a filler in numerous old and recent patents on ink-receiving elements, e.g. U.S. Pat. No. 4,892,591 (MIZUSAWA INDUSTRIAL CHEM), U.S. Pat. No. 4,902,568 (CANON), EP 373573 A (CIBA GEIGY), EP 423829 A (OJI PAPER), EP 487350 A (XEROX), EP 493100 A (SANYO KOKUSAKU PULP), EP 514633 A (SCHOELLER FELIX JUN PAPIER), etc. The silica can be chosen from different types, such as crystalline silica, colloidal silica, amorphous silica, precipitated silica, fumed silica, silica gel, and spherical and non-spherical silica. The silica may contain minor amounts of metal oxides from the group Al, Zr, Ti.

Suitable types of silica for the dotsize control fluid for use in the ink-jet printing process according to the present invention include AEROSIL™ OX50 (BET surface area 50±15 m$^2$/g, average primary particle size 40 nm, SiO$_2$ content>99.8%, Al$_2$O$_3$ content<0.08%), AEROSIL™ MOX170 (BET surface area 170 m$^2$/g, average primary particle size 15 nm, SiO$_2$ content>98.3%, Al$_2$O$_3$ content 0.3-1.3%), AEROSIL™ MOX80 (BET surface area 80±20 m$^2$/g, average primary particle size 30 nm, SiO$_2$ content>98.3%, Al$_2$0$_3$ content 0.3-1.3%), or other hydrophilic AEROSIL™ grades available from DEGUSSA-HÜLS AG, which may give aqueous dispersions with a small average particle size (<500 nm). The colloidal silica's available from BAYER AG under the tradename of KIESELSOL™, e.g. KIESELSOL™ 100, KIESELSOL™ 200, KIESELSOL™ 300 and KIESELSOL™ 500, are also very suitable for the dotsize control fluid for use in the ink-jet printing process according to the present invention.

Other suitable colloidal silica grades include Ludox™ grades from GRACE GmbH; Syton™ 2XFS, Syton™ 240 and Syton™ D30 from MONSANTO; Nalco™ 1030 and Nalco™ 1034A from NALCO CHEMICAL; Snowtex™ Up and Snowtex™ OXS from NISSAN CHEMICAL INDUSTRIES; Nyacol™ 5050 from NYACOL PRODUCT INC; Kieselsaeure™ D17 and Kieselsaeure™ X197 from DEGUSSA; Sylojet™ 4001 from GRACE GmbH; and Highlink Nano™ G502 31 liq from CLARIANT.

The most preferred type of silica for the dotsize control fluid used in the ink-jet printing process according to the present invention is colloidal silica.

The filler content in the dotsize control fluid is preferably between 0.01 wt % and 4 wt %, more preferably between 0.1 wt % and 2 wt % all based on the total weight of the dotsize control fluid.

Dispersants

The dotsize control fluid may further contain a dispersant, in order to obtain a stable dispersion of the inorganic filler(s) in the dotsize control fluid.

A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

Suitable pigment stabilizers are also disclosed in DE 19636382 (BAYER), U.S. Pat. No. 5,720,802 (XEROX), U.S. Pat. No. 5,713,993 (DU PONT), PCT/GB95/02501, U.S. Pat. No. 5,085,689 (BASF) and GB 2303376 (FUJITSU ISOTEC).

Typically dispersants are incorporated at 2.5% to 200%, more preferably at 50% to 150% by weight of the inorganic filler.

Solvents

The dotsize control fluid may contain as a solvent, water and/or organic solvents, such as alcohols, fluorinated solvents and dipolar aprotic solvents. Water, being the preferred solvent, is preferably present in a concentration between 10 and 80 wt %, particularly preferably between 20 and 50 wt %, each based on the total weight of the dotsize control fluid.

Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Surfactants

Surfactants may be incorporated in the dotsize control fluid suitable for the ink-jet printing process according to the present invention. They can be any of the cationic, anionic, amphoteric, and non-ionic ones as described in JP 62280068 A (CANON).

Suitable surfactants for use in the dotsize control fluid suitable for the ink-jet printing process according to the present invention include N-alkylamino acid salts, alkylether carboxylic acid salts, acylated peptides, alkylsulfonic acid salts, alkylbenzene and alkylnaphthalene sulfonic acid salts, sulfosuccinic acid salts, α-olefin sulfonic acid salts, N-acyl-sulfonic acid salts, sulfonated oils, alkylsulfonic acid salts, alkylether sulfonic acid salts, alkylallylethersulfonic acid salts, alkylamidesulfonic acid salts, alkylphosphoric acid salts, alkylether-phosphoric acid salts, alkylallyletherphosphoric acid salts, alkyl and alkylallylpolyoxyethylene ethers, alkylallylform-aldehyde condensed acid salts, alkylal-lylethersulfonic acid salts, alkylamide-sulfonic acid salts, alkylphosphoric acid salts, alkyletherphosphoric acid salts, alkylal-lyletherphosphoric acid salts, alkyl and alkylal-lylpolyoxyethylene ethers, alkylallyl-formaldehyde condensed polyoxyethylene ethers, blocked polymers having polyoxypropylene, polyoxyethylene polyoxypropyl-alkylethers, polyoxyethyleneether of glycolesters, polyoxyethyleneether of sorbitolesters, poly-ethyleneglycol aliphatic acid esters, glycerol esters, propyleneglycol esters, sugaresters, fluoro $C_2$-$C_{10}$ alkyl-carboxylic acids, disodium N-perfluorooctanesul-fonyl glutamate, sodium 3-(fluoro-$C_6$-$C_{11}$-alkyl-oxy)-1-$C_3$-$C_4$ alkyl sulfonates, sodium 3-(ω-fluoro-$C_6$-$C_8$alkanoyl-N-ethylamino)-1-propane sulfonates, N-[3-(perfluorooctanesulfonamide)-propyl]-N,N-dimethyl-N-carboxy-methylene ammonium betaine, fluoro-$C_{11}$-$C_{20}$ alkylcarboxylic acids, perfluoro-$C_7$-$C_{13}$-alkyl-carboxylic acids, perfluorooctane sulfonic acid diethanolamide, Li, K and Na perfluoro-$C_4$-$C_{12}$-alkyl sulfonates, N-propyl-N-(2-hydroxyethyl)per-fluorooctane sulfonamide, perfluoro-$C_6$-$C_{10}$-alkylsulfonamide-propyl-sulfonyl-glycinates, bis-(N-perfluorooctylsulfonyl-N-ethanolamino-ethyl)phosphonate, mono-perfluoro $C_6$-$C_{16}$ alkyl-ethyl phosphonates and perfluoroalkyl-betaine.

Suitable cationic surfactants for use in the dotsize control fluid suitable for the ink-jet printing process according to the present invention include N-alkyl dimethyl ammonium chloride, palmityl trimethyl ammonium chloride, dodecyldimethyl-amine, tetradecyldimethylamine, ethoxylated alkyl guanidine-amine complex, oleamine hydroxypropyl bistrimonium chloride, oleyl imidazoline, stearyl imidazoline, cocamine acetate, palmitamine, dihydroxyethylcocamine, cocotrimonium chloride, alkyl polyglycolether ammonium sulphate, ethoxylated oleamine, lauryl pyridinium chloride, N-oleyl-1,3-diaminopropane, stearamidopropyl dimethylamine lactate, coconut fatty amide, oleyl hydroxyethyl imidazoline, isostearyl ethylimidonium ethosulphate, lauramidopropyl PEG-dimoniumchloride phosphate, palmityl trimethylammonium chloride, and cetyltrimethylammonium bromide.

Especially suitable surfactants for use in the dotsize control fluid suitable for the ink-jet printing process according to the present invention are the fluorocarbon surfactants as described in e.g. U.S. Pat. No. 4,781,985 (JAMES RIVER GRAPHICS) having a structure of:

$F(CF_2)_{4-9}CH_2CH_2SCH_2CH_2N^+R_3X^-$ wherein R is a hydrogen or an alkyl group; and in U.S. Pat. No. 5,084,340 (KODAK) having a structure of:

$CF_3(CF_2)_mCH_2CH_2O(CH_2CH_2O)_nR$ wherein m=2 to 10; n=1 to 18; R is hydrogen or an alkyl group of 1 to 10 carbon atoms. These surfactants are commercially available from DuPont and 3M.

The concentration of the surfactant in the surface layer is preferably in the range of 0.1 to 20%, more preferably in the range of 0.2 to 15% and most preferably in the range of 2 to 10% by weight based on the total dry weight of the surface layer.

Biocides

Suitable biocides for the dotsize control fluid include sodium dehydroacetate, 2-phenoxyethanol, sodium benzoate, sodium pyridinethion-1-oxide, ethyl p-hydroxybenzoate and 1,2-benzisothiazolin-3-one and salts thereof. A preferred biocide for the dotsize control fluid is Proxel™ GXL and Proxel™ Ultra-5 available from AVECIA BIOCIDES.

A biocide is preferably added in an amount of 0.001 to 3 wt %, more preferably 0.01 to 1.00 wt. %, each based on the dotsize control fluid.

Other Additives

In order to improve the dispersibility of inorganic filler particles, the dotsize control fluid may contain various inorganic salts, and acids or alkalis as pH adjusters.

Stabilizers, levelling additives, crosslinking agents, plasticizers, antistatic control agents, odour control agents, spacing agents and adjusting agents for physical film properties such as waxes, may also be added to the dotsize control fluid.

Ink-Receiver

The ink-receiver suitable for the ink-jet printing process according to the present invention is not restricted to any specific type, but substantially non-absorbing ink-receivers for aqueous solutions are preferred. For example, standard paper is an absorbing ink-receiver. On the other hand, a resin-coated paper, e.g. polyethylene-coated paper or polypropylene-coated paper, is substantially non-absorbing for an aqueous solution, and hence very suitable.

The ink-receiver suitable for the ink-jet printing process according to the present invention can be transparent, translucent or opaque. The ink-receiver can be coloured or metallized.

Suitable ink-receivers for the ink-jet printing process according to the present invention are polymeric substrates, for example, cellulose acetate propionate, cellulose acetate butyrate, polyesters such as polyethylene terephthalate (PET) and polyethylene naphthalate (PEN); oriented polystyrene (OPS); oriented nylon (ONy); polypropylene (PP), oriented polypropylene (OPP); polyvinyl chloride (PVC); and various polyamides, polycarbonates, polyimides, polyolefins, poly (vinylacetals), polyethers and polysulfonamides, opaque white polyesters and extrusion blends of polyethylene terephthalate and polypropylene. Acrylic resins, phenol resins, glass and metals may also be used as an ink-receiver. Other suitable ink-receiver materials can be found in Modern Approaches to Wettability: Theory and Applications. Edited by SCHRADER, Malcolm E., et al. New York: Plenum Press, 1992. ISBN 0306439859.

A preferred type of ink receiver is an ink receiver provided with a self-adhesive backlayer. Suitable examples of self-adhesive PVC ink receivers include MPI™ vinyls from AVERY-DENNISON, Digital™ vinyls from METAMARK, Multi-fix™ digital white vinyls from MULTI-FIX and Grafiprint™ vinyls from GRAFITYP.

The ink-receiver may also incorporate mineral particles as fillers, such as e.g. PET containing $CaCO_3$, PET containing $TiO_2$, a-PET and PET-g.

Polyester film substrates and especially polyethylene terephthalate are preferred for certain applications particularly types with excellent dimensional stability.

The ink-receiver may also be made from an inorganic material, such as a metal oxide or a metal (e.g. aluminium and steel).

Other suitable ink-receivers may be selected from the group consisting of cardboard, wood, composite boards, coated plastic, canvas, textile, glasses, plant fibre products, leather, magnetic materials and ceramics.

Radiation Curable Ink

A radiation-curable ink-jet ink suitable for the ink-jet printing process according to the present invention contains at least two components: (i) a radiation-curable compound, and (ii) a photo-initiator.

The radiation-curable compound can be selected from monomers and/or oligomers that can be polymerized by a curing means of an ink-jet printer.

The radiation-curable ink-jet ink preferably further contains at least one colorant, i.e. pigment or dye.

The radiation-curable ink-jet ink may contain a polymerization inhibitor to restrain polymerization by heat or actinic radiation. It is preferred to add an inhibitor during preparation of the ink-jet ink.

The radiation-curable ink-jet ink may further contain at least one resin in order to obtain a stable dispersion of the colorant in the ink-jet ink.

The radiation-curable ink-jet ink preferably further contains at least one surfactant.

The radiation-curable ink-jet ink preferably further contains at least one solvent.

If a solvent is present, the radiation-curable ink-jet ink preferably further contains at least one humectant to prevent the clogging of the nozzle, due to its ability to slow down the evaporation rate of ink.

A biocide may be added to the radiation curable ink-jet ink suitable for the ink-jet printing process according to the present invention to prevent unwanted microbial growth, which may occur in the ink-jet ink over time. The biocide may be used either singly or in combination.

The radiation-curable ink-jet ink may contain additives such as buffering agents, anti-mold agents, pH adjustment agents, electric conductivity adjustment agents, chelating agents, anti-rusting agents, light stabilizers, anti-oxidants, thickeners, dendrimers, and the like. Such additives may be included in the ink-jet inks in any effective amount, as desired. Examples of pH controlling agents suitable for inks of the present invention include, but are not limited to, acids, and bases, including hydroxides of alkali metals such as lithium hydroxide, sodium hydroxide and potassium hydroxide. The amount included will depend, of course, on the specific component being included.

An ink-jet printer generally uses a radiation-curable ink-jet ink set consisting of a plurality of radiation-curable ink-jet inks.

Radiation Curable Compounds

The radiation curable ink-jet ink contains monomers and/or oligomers, which are polymerized by the curing means of the ink-jet printer. Monomers, oligomers or prepolymers may possess different degrees of functionality, and a mixture including combinations of mono-, di-, tri- and higher functionality monomers, oligomers and/or prepolymers may be used. These components are curable, typically photo-curable, e.g. UV curable, and should adhere to the ink-receiver surface after printing and serve to bind the colorant. A mixture of two or more monomers of the same functionality is preferred. With particularly preferred a mixture of two di-functional monomers.

The viscosity of the radiation curable ink-jet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is slow and expensive. If cationic polymerization is used, it is preferred to use an epoxy compound together with an oxetane compound to increase the rate of polymerization. Radical polymerization is the preferred polymerization process.

Any polymerizable compound commonly known in the art may be employed. The radiation-curable compound in the radiation curable ink-jet ink, can be monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylates such as described in U.S. Pat. No. 4,857,630 (DU PONT), 2-(vinyloxy)ethylacrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4butanediol diacrylate, 1,6hexanediol diacrylate, 1,9nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, caprolactam modified dipentaerythritol hexaacrylate, N-vinylamide such as N-vinylcaprolactam or N-vinylformamide; or acrylamide or a substituted acrylamide such as acryloylmorpholine; and amino functionalized polyetheracrylates such as described in U.S. Pat. No. 5,196,502 (KODAK).

Furthermore, methacrylates corresponding to the above-mentioned acrylates may be used with these acrylates. Of the methacrylates, methoxypolyethylene glycol methacrylate, methoxytriethylene glycol methacrylate, 4-(vinyloxy)butyl-methacrylate, vinyl ether acrylates such as described in JP 62280068 A (CANON), hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the ink-jet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

The radiation curable ink-jet ink preferably contains less than 20 wt %, more preferably less than 15 wt % of a monofunctional monomer, each based on the total ink weight.

Initiators

An initiator is a catalyst, usually called a photo-initiator, for initiating the polymerization reaction. The photo-initiator requires less energy to activate than the monomers and oligomers to form the polymer. The photo-initiator absorbs light and is responsible for the production of free radicals or cations. Free radicals or cations are high-energy species that induce polymerization of monomers, oligomers and polymers and with polyfunctional monomers and oligomers thereby also inducing cross-linking.

A Norrish type I initiator is an initiator which cleaves after excitation, yielding the initiating radical immediately.

A preferred Norrish type I-initiator is selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and α-halophenylglyoxalates.

A Norrish Type II initiator is an initiator which is activated by actinic radiation and forms free radicals by hydrogen abstraction or electron extraction from a second compound, the synergist, that becomes the actual initiating free radical.

A preferred Norrish type II-initiator is selected from the group consisting of benzophenones, thioxanthones, 1,2-diketones and anthraquinones.

Suitable Norrish type I and II-initiators are disclosed in CRIVELLO, J. V., et al. VOLUME III: Photoinitiators for Free Radical Cationic & Anionic Photopolymerization. 2ndth edition. Edited by BRADLEY, G. London, UK: John Wiley and Sons Ltd, 1998. p. 287-294.

A preferred amount of initiator is 1-50 wt % of the total ink weight, and more preferably 1 to 25 wt % of the total ink weight.

Irradiation with actinic radiation may be realized in two steps by changing wavelength or intensity. In such cases it is preferred to use 2 types of initiator together.

Suitable photo-initiators, well-known under their commercial tradename, include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 4265 and Darocur™ ITX available from CIBA SPECIALTY CHEMICALS, Lucerin TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

Synergists

Any synergist or co-initiator known in the prior art can be used. A preferred co-initiator is selected from the group consisting of an aliphatic amine, an aromatic amine and a thiol. Tertiary amines, heterocyclic thiols and 4-dialkylamino-benzoic acid derivatives are particularly preferred.

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer™ GA-80, Sumilizer™ GM and Sumilizer™ GS produced by Sumitomo Chemical Co., Ltd; Genorad™ 16 avaliable from RAHN.

Since excessive addition of these polymerization inhibitors will lower the ink sensitivity to curing, it is preferred that the amount capable of preventing polymerization be determined prior to blending. The amount of a polymerization inhibitor is generally between 200 and 20,000 ppm of the total ink weight.

Colorants

Colorants may be dyes, but are preferably pigments or a combination thereof. Organic and/or inorganic pigments may be used.

The pigment particles should be sufficiently small to permit free flow of the ink through the ink-jet printing device, especially at the ejecting nozzles which usually have a diameter ranging from 10 µm to 50 µm. The particle size influences also the pigment dispersion stability. It is also desirable to use small particles for maximum colour strength. The particles of the pigment dispersed in the ink-jet ink should have a particle size of less than 10 µm, preferably less than 3 µm, and most preferably less than 1 µm. The average particle size of pigment particles is preferably 0.05 to 0.5 µm. Very fine dispersions of pigments and methods for their preparation are disclosed in e.g. EP 776952 A (KODAK), U.S. Pat. No. 5,538, 548 (BROTHER), U.S. Pat. No. 5,443,628 (VIDEOJET SYSTEMS), EP 259130 A (OLIVETTI), U.S. Pat. No. 5,285, 064 (EXTREL), EP 429828 A (CANON) and EP 526198 A (XEROX).

The pigment particles should be sufficiently small to permit free flow of the ink through the ink-jet printing device, especially at the ejecting nozzles which usually have a diameter ranging from 10 µm to 50 µm. The particle size influences also the pigment dispersion stability. It is also desirable to use small particles for maximum colour strength.

The average particle diameter of the pigment should be between 0.005 µm and 15 µm. Preferably, the average pigment particle size is between 0.005 and 5 µm, more preferably between 0.005 and 1 µm, and particularly preferably between 0.005 and 0.3 µm. Larger pigment particle sizes may be used as long as the objectives of the present invention are achieved.

The pigment can be black, cyan, magenta, yellow, red, orange, violet, blue, green, brown, mixtures thereof, and the like.

Suitable pigments for the radiation curable ink-jet ink include those described in The Colour Index, Vols. 1-8, Society of Dyers and Colourists, Yorkshire, England having the designations: C. I. Pigment Yellow 17, C. I. Pigment Blue 27, C. I. Pigment Red 49:2, C. I. Pigment Red 81:1, C. I. Pigment Red 81:3, C. I. Pigment Red 81:x, C. I. Pigment Yellow 83, C. I. Pigment Red 57:1, C. I. Pigment Red 49:1, C. I. Pigment Violet 23, C. I. Pigment Green 7, C. I. Pigment Blue 61, C. I. Pigment Red 48:1, C. I. Pigment Red 52:1, C. I. Pigment Violet 1, C. I. Pigment White 6, C. I. Pigment Blue 15, C. I. Pigment Yellow 12, C. I. Pigment Blue 56, C. I. Pigment Orange 5, C. I. Pigment Yellow 14, C. I. Pigment Red 48:2, C. I. Pigment Blue 15:3, C. I. Pigment Yellow 1, C. I. Pigment Yellow 3, C. I. Pigment Yellow 13, C. I. Pigment Orange 16, C. I. Pigment Yellow 55, C. I. Pigment Red 41, C. I. Pigment Orange 34, C. I. Pigment Blue 62, C. I. Pigment Red 22, C. I. Pigment Red 170, C. I. Pigment Red 88, C. I. Pigment Yellow 151, C. I. Pigment Red 184, C. I. Pigment Blue 1:2, C. I. Pigment Red 3, C. I. Pigment Blue 15:1, C.I. Pigment Blue 15:3, C.I. Pigment Blue 15:4, C. I. Pigment Red 23, C. I. Pigment Red 112, C. I. Pigment Yellow 126, C. I. Pigment Red 169, C. I. Pigment Orange 13, C. I. Pigment Red 1-10,12, C.I. Pigment Blue 1:X, C.I. Pigment Yellow 42, C.I. Pigment Red 101, C.I. Pigment Brown 6, C. I. Pigment Brown 7, C. I. Pigment Brown 7:X, C. I. Pigment Metal 1, C. I. Pigment Metal 2, C.I. Pigment Yellow 128, C.I. Pigment Yellow 93, C.I. Pigment Yellow 74, C.I. Pigment Yellow 138, C.I. Pigment Yellow 139, C.I. Pigment Yellow 154, C. I. Pigment Yellow 185, C.I. Pigment Yellow 180, C.I. Pigment Red 122, C.I. Pigment Red 184, bridged aluminium phthalocyanine pigments and solid solutions of pigments.

For a radiation curable black ink, suitable pigment materials include carbon blacks such as Regal 400R, Mogul L, Elftex 320 from Cabot Co., or Carbon Black FW18, Special Black 250, Special Black 350, Special Black 550, Printex 25, Printex 35, Printex 55, Printex 150T from DEGUSSA Co., and C.I. Pigment Black 7 and C.I. Pigment Black 11. Additional examples of suitable pigments are disclosed in U.S. Pat. No. 5,389,133 (XEROX).

Further the pigment may be chosen from those disclosed by HERBST, W, et al. Industrial Organic Pigments, Production, Properties, Applications. 2nd edition. vch, 1997.

Particular preferred pigments are Pigment Yellow 1, 3, 10, 12, 13, 14, 17, 65, 73, 74, 75, 83, 93, 109, 120, 128, 138, 139, 150, 151, 154, 155, 180, 185; Pigment Red 17, 22, 23, 57:1, 122, 144, 146, 170, 176, 184, 185, 188, 202, 206, 207, 210; Pigment Blue 15:1, Pigment Blue 15:2, Pigment Blue 15:3, Pigment Blue 15:4, and Pigment Blue 16.

Resins

The radiation curable ink-jet ink may further contain a resin, also called a pigment stabilizer or dispersant, in order to obtain a stable dispersion of the pigment(s) in the ink-jet ink.

The pigments may be added to the radiation curable ink-jet ink as a dispersion comprising a dispersant.

Suitable resins: petroleum type resins (e.g., styrene type, acryl type, polyester, polyurethane type, phenol type, butyral type, cellulose type, and rosin); and thermoplastic resins (e.g., vinyl chloride, vinylacetate type). Concrete examples of these resins include acrylate copolymers, styrene-acrylate copolymers, acetalized and incompletely saponified polyvinyl alcohol, and vinylacetate copolymers. Commercial resins are known under the tradenames Solsperse™ 32000 and Solsperse™ 39000 available from AVECIA, EFKA™ 4046 available from EFKA CHEMICALS BV, Disperbyk™ 168 available from BYK CHEMIE GmbH.

A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

Suitable pigment stabilizers are also disclosed in DE 19636382 (BAYER), U.S. Pat. No. 5,720,802 (XEROX), U.S. Pat. No. 5,713,993 (DU PONT), PCT/GB95/02501, U.S. Pat. No. 5,085,689 (BASF) and U.S. Pat. No. 2,303,376 (FUJITSU ISOTEC).

Typically resins are incorporated at 2.5% to 200%, more preferably at 50% to 150% by weight of the pigment.

Surfactants

The radiation curable ink-jet ink may contain at least one surfactant. The surfactant(s) can be anionic, cationic, non-ionic, or zwitter-ionic and are usually added in a total quantity below 20 wt % based on the total ink weight and particularly in a total below 10 wt % based on the total ink weight.

A fluorinated or silicone compound may be used as a surfactant, however, a potential drawback is extraction by food from ink-jet food packaging material because the surfactant does not cross-link. It is therefore preferred to use a copolymerizable monomer having surface-active effects, for example, silicone-modified acrylates, silicone modified methacrylates, fluorinated acrylates, and fluorinated methacrylates.

Solvents

The radiation curable ink-jet ink may contain as solvent, water and/or organic solvents, such as alcohols, fluorinated solvents and dipolar aprotic solvents. The solvent is preferably present in a concentration between 10 and 80 wt %, particularly preferably between 20 and 50 wt %, each based on the total weight of the radiation curable ink-jet ink.

The radiation curable ink-jet ink preferably does not contain an evaporable component, but sometimes, it can be advantageous to incorporate an extremely small amount of an organic solvent in such inks to improve adhesion to the ink-receiver surface after UV curing. In this case, the added solvent can be any amount in the range which does not cause problems of solvent resistance and VOC, and preferably 0.1-5.0 wt %, and particularly preferably 0.1-3.0 wt %, each based on the total weight of the radiation curable ink-jet ink Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Humectants

Suitable humectants include triacetin, N-methyl-2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. A preferred humectant is polyethylene glycerol and added to the ink-jet ink formulation in an amount of 0.1 to 30 wt % of the formulation, more preferably 0.1 to 10 wt % of the formulation, and most preferably approximately 4.0 to 7.0 wt %.

Biocides

Suitable biocides for the radiation curable ink-jet ink include sodium dehydroacetate, 2-phenoxyethanol, sodium benzoate, sodium pyridinethion-1-oxide, ethyl p-hydroxybenzoate and 1,2-benzisothiazolin-3-one and salts thereof. A preferred biocide for the radiation curable ink-jet ink is Proxel™ GXL available from AVECIA BIOCIDES.

A biocide is preferably added in an amount of 0.001 to 3 wt %, more preferably 0.01 to 1.00 wt. %, each based on the radiation curable ink-jet ink.

EXAMPLES

The present invention will now be described in detail by way of Examples hereinafter. However the invention is not limited to these examples Measurement Methods 1. Dotsize The dot size was determined with a ImageXpert™ set-up available from IMAGEXPERT using Image-Pro image analysis software available from MEDIA CYBERNETICS. Dot size measurement was performed by measuring the diameter of a single dot ignoring any satellites, a satellite being an overlapping dot produced by another ink-jet ink droplet or produced by a part of the same ink-jet ink droplet. The dotsize was determined as the average of about 100 dots measured.

2. MDD

The MDD is an abbreviation for the Maximum Difference in Dotsize. It is the absolute value of the largest difference in dotsize between a first and a second ink receiver for a given set of ink-receivers, either having the same surface layer or having no surface layer.

Materials

All materials used in the examples were readily available from standard commercial sources such as ALDRICH CHEMICAL Co. (Belgium) unless otherwise specified. The "water" used in the examples was deionized water. The following materials were used:

LATEX-1 was prepared according to the following procedure:

A pre-emulsion was made by adding 1,69 kg ethyl acrylate (CAS 140-88-5), 0.422 kg methacrylic acid (CAS 79-41-4), 0.352 kg sodium dodecyl sulfate (CAS 151-21-3) and 2.163 kg demineralized water in a reactor.

A reductor solution was made by adding 95 g demineralized water and 5.92 g sodium metabisulfite (CAS 7681-57-4) in a second recipient. After dissolving, demineralized water was added to 127 mL.

An initiator solution was made by dissolving 6.64 g ammonium persulfate in 110 g demineralized water.

A reactor was filled with 2.5 kg demineralized water and stirred at 75 rpm. The temperature was raised to 70° C. The initiator solution was added to the pre-emulsion and stirred for 15 minutes. Then 0.66 g sodium metabisulfite was added to the reactor at 70° C. and 0.47 L of the pre-emulsion containing the initiator solution. The temperature was increased to 75° C. At 75° C., the reaction started and the reaction temperature increased further. The heating of the reactor was stopped and the rest of the pre-emulsion and the reductor solution were added via separate flows over 1 hour. The temperature increased to 95° C. and was kept at 95° C. during the rest of the reaction. After adding these two flows, the pre-emulsion reactor was rinsed with 0.57 kg demineralized water and the reductor recipient was rinsed with 0.11 kg demineralized water. This rinsing water was then pumped to the reactor. After adding the rinsing water, the reaction mixture was stirred for one hour at 95° C.

Demonomerization was performed under vacuum until 0.57 L of liquid was condensed. The reaction mixture was cooled and adjusted with demineralized water to have 27% by weight of solids and then filtered. LATEX-2 is NEOCRYL A639 available from ZENECA RESINS BV, which contains 45% solids.

LATEX-3 was prepared according to the following procedure: 514.75 g of a 10% by weight solution of the mono sodium salt of a styrene-maleic acid copolymer was heated under stirring to 65° C. The reaction mixture was kept under a nitrogen atmosphere during the entire preparation. When the solution reached 65° C., 7.2 g of $K_2S_2O_8$ was added. The solution was stirred for two hours at 65° C. and then cooled to room temperature to deliver solution A.

In a 20 l reactor, 1823.12 g demineralised water, 10324.6 g methanol, 3217.87 g methylmethacrylate, 65.67 g stearylmethacrylate, 65.67 g Nonylphenolpolyglycolether (Hostapal B) and 4 g citric acid were mixed. This reaction mixture was stirred at 55 rpm with a nitrogen flow beneath the surface of the solution, and heated to 65° C. Then 492.5 g of solution A was added in 3 minutes under stirring. The reaction was continued at a target temperature of 65° C. About 1 minute after adding solution A, the clear solution turns into a milky-white dispersion. The reaction was cooled to room temperature and filtered through a nylon tissue with a pore size of 50μ. The end dispersion had a solid content of about 20 wt %. This dispersion was de-alcoholized by decanting after settling down of the particles (several weeks), and by replacing the decanted solution by demineralized water.

LATEX-4 is a 30% aqueous solution of a film forming polymeric resin based on a copolymer (CAS 29757-50-4) of 88 wt % vinylidene chloride, 10 wt % methylacrylate and 2 wt % itaconic acid and containing 2.5 wt % of Hostapon T based on the weight of the copolymer.

KIESELSOL™ 100 and KIESELSOL™ 500 are colloidal silica's available from BAYER AG, whereby the number indicates the surface area in m² per gram.

SIL-500 is a 15% aqueous dispersion of KIESELSOL™ 500.

SIL-100 is a 36% aqueous dispersion of KIESELSOL™ 100.

NaOH-sol is a 8% solution of sodium hydroxide in water.

Mersolat™ H, a mixture of secondary alkane sulfonates from BAYER.

MERSOL is a 4.85% aqueous solution of Mersolat™ H.

Hostapon™ T powder, an anionic dispersant from CLARIANT.

Arkopal™ $NO_{60}$, a nonylphenol ethoxylate type surfactant from CLARIANT.

TSC 033™ is cyan colorant (CAS 152876-71-6) available from AGFA. Carbon Black MA8™ is a carbon black available from MITSUBISHI CHEMICAL.

Sunfast™ Blue 249-1284 is a cyan pigment (Pigment Blue 15:3) available from SUN CHEMICAL.

Hostaperm™ Red E5B02 is a magenta pigment (Pigment Violet 19) available from CLARIANT.

DPGDA™ is a difunctional acrylate monomer available from UCB.

Craynor™ CN 501 is a monomer available from CRAY VALLEY.

Sartomer™ SR9003 is a difunctional acrylate monomer available from SARTOMER.

Sartomer™ SR339 is 2-phenoxyethyl acrylate available from SARTOMER. Craynor™ CN 386 is an amine modified acrylate synergist available from CRAY VALLEY.

Darocur™ ITX is a photo-initiator available from CIBA SPECIALTY CHEMICALS.

Solsperse™ 32000 is a resin available from AVECIA.

Solsperse™ 5000 is a resin available from AVECIA.

Byk™-333 is a surfactant available from BYK CHEMIE GmbH.

Proxel™ Ultra-5 is a biocide available from AVECIA BIOCIDES, UK.

NMP is N-methylpyrrolidone.

SURF-sol is an aqueous solution of 323 mL of NMP, 30 mL of Proxel™

Ultra-5 and 90 g of Arkopal™ $NO_{60}$ in 557 mL of water.

CUNO filters are available from CUNO Belux

Dotsize Control Fluids

The dotsize control fluids DCF-1 to DCF-9 were prepared by the mixing of the components LATEX-1, LATEX-2, LATEX-3, NaOH-sol, SURF-sol and SIL-500 according to Table 1 and Table 2. The fluids were then diluted with water to 4 L and filtered over a 5 micron CUNO filter.

TABLE 1

| Component | DCF-1 (in mL) | DCF-2 (in mL) | DCF-3 (in mL) | DCF-4 (in mL) | DCF-5 (in mL) |
|---|---|---|---|---|---|
| Water | 3584 | 3792 | 3168 | 3530 | 3765 |
| LATEX-1 | 4 | 4 | 4 | 4 | 4 |
| NaOH-sol | 24 | 12 | 48 | 24 | 12 |
| SURF-sol | 120 | 60 | 240 | 120 | 60 |
| LATEX-2 | 226 | 113 | 452 | 200 | 100 |
| SIL-500 | 40 | 20 | 80 | 120 | 60 |
| LATEX-3 | 6 | 3 | 12 | 6 | 3 |

TABLE 2

| Component | DCF-6 (in mL) | DCF-7 (in mL) | DCF-8 (in mL) | DCF-9 (in mL) |
|---|---|---|---|---|
| Water | 3060 | 3476 | 3738 | 2952 |
| LATEX-1 | 4 | 4 | 4 | 4 |
| NaOH-sol | 48 | 24 | 12 | 48 |
| SURF-sol | 240 | 120 | 60 | 240 |
| LATEX-2 | 400 | 174 | 87 | 348 |
| SIL-500 | 240 | 200 | 100 | 400 |
| LATEX-3 | 12 | 6 | 3 | 12 |

The dotsize control fluid DCF-10 was prepared according to Table 3 by the mixing of 246 mL of LATEX-4, 48 mL of SIL-100 and 10 ml of MERSOL. This solution was then diluted with water to 1 L and filtered over a 5 micron CUNO filter.

TABLE 3

| Component | DCF-10 (in mL) |
|---|---|
| Water | 696 |
| LATEX-4 | 246 |
| SIL-100 | 48 |
| MERSOL | 10 |

The dotsize control fluid DCF-11 was prepared by the mixing of the components LATEX-1, LATEX-2, LATEX-3, NaOH-sol, SURF-sol and SIL-500 according to Table 4.

TABLE 4

| Component | DCF-11 (in mL) |
|---|---|
| Water | 1761 |
| LATEX-1 | 12 |
| NaOH-sol | 4 |
| SURF-sol | 60 |
| LATEX-2 | 100 |
| SIL-500 | 60 |
| LATEX-3 | 3 |

Ink Receivers

REC-1 is a 175 μm unsubbed PET substrate with on the backside an antiblocking layer with antistatic properties available from AGFA-GEVAERT as P175C PLAIN/ABAS.

REC-2 is an unsubbed, untreated PE-paper of 140 g/m² having 20 g/m² of polyethylene on both sides, available from FRANTSCHACH BELCOAT. REC-3 is Filmolux 136, an unsubbed, untreated opaque, glossy, 60 μm polymeric Vinyl support with self-adhesive back, available from NESCHEN AG.

REC-4 is obtained by air knife coating of DCF-10 to a uniaxially oriented PET (140 m²/l), then dried at 150° C. air temperature and stretched in a transversal direction (factor 3.6).

The other ink-receivers were obtained by selecting one of the above ink-receivers REC-1 to REC-4, and applying one of the dotsize control fluids DCF-1 to DCF-9 and DCF-11 to these ink-receivers. All dotsize control fluids are coated on the ink-receiver in the same manner as exemplified for DCF-1 coated onto REC-1.

The dotsize control fluid DCF-1 is filtered over a 5 micron CUNO filter and coated at 12 m/min and 42° C. with a slot coating at a wet thickness of 33.3 μm onto the ink-receiver REC-1 having a temperature of 50° C. The coated layer is dried at a temperature of 60° C. for 2 minutes Radiation Curable Inks The radiation curable ink-jet inks were prepared to consist of 100% solids; no solvents or water are used during the preparation of the ink composition. The ink compositions Ink-1 to Ink-5 were prepared according to Table 5. The weight % (wt %) was based on the total ink weight.

TABLE 5

| Component | INK-1 wt % | INK-2 wt % | INK-3 wt % | INK-4 wt % | INK-5 wt % |
|---|---|---|---|---|---|
| Carbon Black MA8 ™ | 2.25 | — | — | — | — |
| Sunfast ™ Blue 249–1284 | 0.81 | — | — | — | — |
| Hostaperm ™ Red E5802 | 0.81 | — | — | — | — |
| TSC 033 ™ | — | 2.00 | 2.00 | 2.00 | 2.00 |
| Solsperse ™ 32000 | 3.87 | — | — | — | — |
| Solsperse ™ 5000 | 0.20 | — | — | — | — |
| Sartomer ™ SR 9003 | 40.00 | 40.00 | 40.00 | 52.00 | 53.00 |
| DPGDA ™ | 37.02 | — | — | — | — |
| Sartomer ™ SR339 | — | 43.00 | 42.00 | — | — |
| Craynor ™ CN501 | — | — | — | 30.00 | 30.00 |
| Darocur ™ ITX | 5.00 | 5.00 | 5.00 | 5.00 | 5.00 |
| Craynor ™ 386 | 10.00 | 10.00 | 10.00 | 10.00 | 10.00 |
| Byk ™ 333 | 0.03 | — | 1 | 1 | — |
| | — | — | — | — | — |
| Viscosity (mPa · s) | 24.3 | 14.6 | 14.7 | 29.6 | 29.4 |
| Surface tension (mN/m) | 28.0 | 34.9 | 22.6 | 23.7 | 33.1 |

First a concentrated dispersion was prepared of the pigments by mixing the pigment(s), the polymeric dispersant Solsperse™ 32000 and Solsperse™ 5000 and the monomers Sartomer™ SR 9003, DPGDA™, Sartomer™ SR339 and/or Craynor™ CN501 with a dissolver and treating this mixture with an Eiger bead mill. The other compounds were added in the order of Table 5 under stirring to the concentrated pigment dispersion. Stirring was continued for one hour to ensure that all components were well distributed. A homogeneous ink composition was obtained.

Example 1

This example illustrates that the ratio P/F of film forming polymeric resin over inorganic filler must be greater than 3.0.

The ratio P/F represents the ratio of P, the weight % of film forming polymeric resin, over F, the weight % of inorganic filler, both weight % are based on the total weight of the dotsize control fluid.

Three different ink-receivers REC-1 to REC-3 were selected and were used as reference samples REF-1 TO REF-3 not provided with a dot control fluid. The comparative samples COMP-1 to COMP-3 were coated with a dot control fluid DCF-3 having a P/F ratio smaller than 3.0, while the inventive samples INV-1 to INV-6 were coated with a dot size control fluid having a P/F ratio greater than 3.0.

TABLE 6

| Sample | Ink-receiver | Dot control fluid | Ratio P/F | Dotsize (μm) |
|---|---|---|---|---|
| REF-1 | REC-1 | None | — | 163.6 |
| REF-2 | REC-2 | None | — | 137.1 |
| REF-3 | REC-3 | None | — | 113.3 |
| INV-1 | REC-1 | DCF-1 | 18.7 | 69.8 |
| INV-2 | REC-2 | DCF-1 | 18.8 | 85.2 |
| INV-3 | REC-3 | DCF-1 | 18.6 | 88.8 |
| INV-4 | REC-1 | DCF-4 | 5.5 | 66.8 |
| INV-5 | REC-2 | DCF-4 | 5.6 | 80.1 |
| INV-6 | REC-3 | DCF-4 | 5.5 | 87.7 |
| COMP-1 | REC-1 | DCF-7 | 2.9 | 72.5 |
| COMP-2 | REC-2 | DCF-7 | 2.9 | 124.9 |
| COMP-3 | REC-3 | DCF-7 | 2.9 | 90.2 |

The radiation curable inkjet ink-1 was jetted with a droplet volume of 45 pL on all the samples of Table 6 using a custom built ink-jet printer equipped with a UPH print head available from AGFA. About 2 seconds after jetting, the samples were cured using a Fusion DRSE-120 conveyer, equipped with a Fusion VPS/I600 lamp (D-bulb), which transported the samples under the UV lamp on a conveyer belt at a speed of 20 m/min. The dotsize was determined for each cured sample. The results are shown in Table 7.

TABLE 7

| First ink receiver | Second ink receiver | Difference in dotsize (μm) | | | |
|---|---|---|---|---|---|
| | | No dot control fluid | DCF-1 | DCF-4 | DCF-7 |
| REC-1 | REC-2 | 26.5 | 15.4 | 13.3 | 52.4 |
| REC-1 | REC-3 | 50.3 | 19.0 | 20.9 | 17.7 |
| REC-2 | REC-3 | 23.8 | 3.6 | 7.6 | 34.7 |
| MDD (in μm) = | | 50.3 | 19.0 | 20.9 | 52.4 |

From Table 7 it is clear that only the dot control fluids DCF-1 and DCF-4 having a ratio P/F greater than 3.0, used to prepare the inventive samples INV-1 to INV-6, exhibited limited differences in dotsize compared to the different uncoated ink-receivers REC-1 to REC-3 and the ink-receivers coated with the dot control fluid DCF-7 having a ratio P/F smaller than 3.0.

Example 2

This example demonstrates that the thickness of the surface layer applied onto an ink-receiver is not critical using the dotsize control fluids according to the invention.

Four different ink-receivers REC-1 to REC-4 were used as reference samples REF-4 to REF-7 not provided with any dot control fluid DCF. The comparative samples COMP-4 to COMP-15 were coated on the ink-receivers REC-1 to REC-4 with a dot control fluid having a P/F ratio smaller than 3.0. The inventive samples INV-7 to INV-30 were coated on the ink-receivers REC-1 to REC-4 with a dot size control fluid having a P/F ratio greater than 3.0. For each ratio P/F, the thickness of the coated surface layer was varied according to Table 8 from about 550 to about 2160 mg/m².

The radiation curable inkjet ink-1 was jetted with a droplet volume of 45 pL on all the samples of Table 8 using a custom built ink-jet printer equipped with a UPH print head available from AGFA. About 2 seconds after jetting, the samples were cured using a Fusion DRSE-120 conveyer, equipped with a Fusion VPS/I600 lamp (D-bulb), which transported the samples under the UV lamp on a conveyer belt at a speed of 20 m/min. The dotsize was determined for each cured sample. The results are also shown in Table 8.

TABLE 8

| Sample | Ink receiver | Dot control fluid | Dry Thickness (mg/m²) | Ratio P/F | Dotsize (μm) |
|---|---|---|---|---|---|
| REF-4 | REC-1 | None | 0 | — | 163.6 |
| REF-5 | REC-2 | None | 0 | — | 137.1 |
| REF-6 | REC-3 | None | 0 | — | 113.3 |
| REF-7 | REC-4 | None | 0 | — | 86.3 |
| INV-7 | REC-1 | DCF-1 | 1088 | 18.7 | 69.8 |
| INV-8 | REC-2 | DCF-1 | 1088 | 18.7 | 85.2 |
| INV-9 | REC-3 | DCF-1 | 1088 | 18.7 | 88.8 |
| INV-10 | REC-4 | DCF-1 | 1088 | 18.7 | 65.2 |
| INV-11 | REC-1 | DCF-2 | 549 | 18.8 | 72.0 |
| INV-12 | REC-2 | DCF-2 | 549 | 18.8 | 84.8 |
| INV-13 | REC-3 | DCF-2 | 549 | 18.8 | 90.5 |
| INV-14 | REC-4 | DCF-2 | 549 | 18.8 | 67.4 |
| INV-15 | REC-1 | DCF-3 | 2167 | 18.9 | 70.6 |
| INV-16 | REC-2 | DCF-3 | 2167 | 18.9 | 86.0 |
| INV-17 | REC-3 | DCF-3 | 2167 | 18.9 | 87.7 |
| INV-18 | REC-4 | DCF-3 | 2167 | 18.9 | 64.4 |
| INV-19 | REC-1 | DCF-4 | 1083 | 5.5 | 66.8 |
| INV-20 | REC-2 | DCF-4 | 1083 | 5.5 | 80.1 |
| INV-21 | REC-3 | DCF-4 | 1083 | 5.5 | 87.7 |
| INV-22 | REC-4 | DCF-4 | 1083 | 5.5 | 65.5 |
| INV-23 | REC-1 | DCF-5 | 546 | 5.6 | 73.4 |
| INV-24 | REC-2 | DCF-5 | 546 | 5.6 | 86.4 |
| INV-25 | REC-3 | DCF-5 | 546 | 5.6 | 91.0 |
| INV-26 | REC-4 | DCF-5 | 546 | 5.6 | 69.3 |
| INV-27 | REC-1 | DCF-6 | 2157 | 5.5 | 67.9 |
| INV-28 | REC-2 | DCF-6 | 2157 | 5.5 | 82.6 |
| INV-29 | REC-3 | DCF-6 | 2157 | 5.5 | 89.7 |
| INV-30 | REC-4 | DCF-6 | 2157 | 5.5 | 67.5 |
| COMP-4 | REC-1 | DCF-7 | 1078 | 2.9 | 72.5 |
| COMP-5 | REC-3 | DCF-7 | 1078 | 2.9 | 124.9 |
| COMP-6 | REC-3 | DCF-7 | 1078 | 2.9 | 90.2 |
| COMP-7 | REC-4 | DCF-7 | 1078 | 2.9 | 70.4 |
| COMP-8 | REC-1 | DCF-8 | 543 | 2.9 | 109.6 |
| COMP-9 | REC-3 | DCF-8 | 543 | 2.9 | 129.2 |
| COMP-10 | REC-3 | DCF-8 | 543 | 2.9 | 127.8 |
| COMP-11 | REC-4 | DCF-8 | 543 | 2.9 | 76.4 |
| COMP-12 | REC-1 | DCF-9 | 2147 | 2.9 | 87.1 |
| COMP-13 | REC-3 | DCF-9 | 2147 | 2.9 | 124.7 |
| COMP-14 | REC-3 | DCF-9 | 2147 | 2.9 | 108.3 |
| COMP-15 | REC-4 | DCF-9 | 2147 | 2.9 | 73.3 |

The results for the inventive samples INV-7 tot INV-18 with a ratio P/F of about 18.8 can be compared with the reference samples REF-4 to REF-7 in Table 9.

TABLE 9

| First ink receiver | Second ink receiver | Difference in dotsize (μm) | | |
|---|---|---|---|---|
| | | No DCF | Thickness of DCF (mg/m²) | |
| | | | 1088 | 549 | 2167 |
| REC-1 | REC-4 | 77.3 | 4.6 | 4.6 | 6.2 |
| REC-1 | REC-2 | 26.5 | 15.4 | 12.8 | 15.4 |
| REC-1 | REC-3 | 50.3 | 19.0 | 18.5 | 17.1 |
| REC-2 | REC-3 | 23.8 | 3.6 | 5.7 | 15.4 |
| REC-2 | REC-4 | 77.3 | 20.0 | 17.4 | 21.6 |
| REC-3 | REC-4 | 27.0 | 23.6 | 23.1 | 23.3 |
| MDD | | 77.3 | 23.6 | 23.1 | 23.3 |

The results for the inventive samples INV-19 tot INV-30 with a ratio P/F of about 5.5 can be compared with the reference samples REF-4 to REF-7 in Table 10.

TABLE 10

| First ink receiver | Second ink receiver | Difference in dotsize (μm) | | |
|---|---|---|---|---|
| | | No DCF | Thickness of DCF (mg/m²) | |
| | | | 1083 | 546 | 2157 |
| REC-1 | REC-4 | 77.3 | 1.3 | 4.1 | 0.4 |
| REC-1 | REC-2 | 26.5 | 13.0 | 13.0 | 14.7 |
| REC-1 | REC-3 | 50.3 | 20.9 | 17.6 | 21.8 |
| REC-2 | REC-3 | 23.8 | 7.6 | 4.6 | 7.1 |
| REC-2 | REC-4 | 77.3 | 14.6 | 17.1 | 15.1 |
| REC-3 | REC-4 | 27.0 | 22.2 | 21.7 | 22.2 |
| MDD | | 77.3 | 22.2 | 21.7 | 22.2 |

The results for the comparative samples COMP-4 tot COMP-15 with a ratio P/F of 2.9 can be compared with the reference samples REF-4 to REF-7 in Table 11.

TABLE 11

| First ink receiver | Second ink receiver | Difference in dotsize (μm) | | |
|---|---|---|---|---|
| | | No DCF | Thickness of DCF (mg/m²) | |
| | | | 1078 | 543 | 2147 |
| REC-1 | REC-4 | 77.3 | 2.1 | 33.2 | 13.8 |
| REC-1 | REC-2 | 26.5 | 52.4 | 19.6 | 37.6 |
| REC-1 | REC-3 | 50.3 | 17.7 | 18.2 | 21.2 |
| REC-2 | REC-3 | 23.8 | 34.7 | 1.4 | 16.4 |
| REC-2 | REC-4 | 77.3 | 54.5 | 52.8 | 51.4 |
| REC-3 | REC-4 | 27.0 | 17.7 | 51.4 | 35.0 |
| MDD | | 77.3 | 54.5 | 52.8 | 51.4 |

The results in Table 9, Table 10 and Table 11 demonstrate that only the inventive samples INV-7 tot INV-30 exhibited differences in dotsize smaller than 30 μm and this for every set for of a first and a second ink-receiver and for every thickness of the coated surface layer. For the reference samples REF-4 to REF-7 and also for the comparative samples COMP-4 to COMP-15, at least one set of a first and a second ink-receiver was found exhibiting a difference in dotsize of at least 50 μm.

Example 3

This example demonstrates that different radiation curable inkjet inks can be used when a surface layer was applied onto an ink-receiver using the dotsize control fluids according to the invention.

Five different radiation curable inkjet inks INK-1 to INK-5 were jetted onto four different ink-receivers without a surface layer, resulting in the comparative samples COMP-16 to COMP-19. The same radiation curable inkjet inks INK-1 to INK-5 were also jetted onto an ink-receiver provided with a surface layer of DCF-11 according to the present invention, resulting in the inventive samples INV-31 to INV-34. The radiation curable inkjet inks were jetted with a droplet volume of 45 pL using a custom built ink-jet printer equipped with a UPH print head available from AGFA. About 4 seconds after jetting, the samples were cured using a Fusion DRSE-120 conveyer, equipped with a Fusion VPS/1600 lamp (D-bulb), which transported the samples under the UV lamp on a conveyer belt at a speed of 20 m/min. The dotsize was determined for each cured sample and is shown in Table 12.

TABLE 12

| Sample | Ink receiver | DCF 11 | ratio P/F | Dotsize (μm) | | | | |
|---|---|---|---|---|---|---|---|---|
| | | | | INK-1 | INK-2 | INK-3 | INK-4 | INK-5 |
| COMP-16 | REC-1 | no | — | 172 | 199 | 235 | 209 | 144 |
| COMP-17 | REC-2 | no | — | 117 | 104 | 228 | 196 | 146 |
| COMP-18 | REC-3 | no | — | 135 | 129 | 177 | 189 | 142 |
| COMP-19 | REC-4 | no | — | 75 | 81 | 98 | 95 | 91 |
| INV-31 | REC-1 | yes | 4.9 | 89 | 98 | 105 | 100 | 99 |
| INV-32 | REC-2 | yes | 4.9 | 105 | 112 | 120 | 114 | 113 |
| INV-33 | REC-3 | yes | 4.9 | 102 | 105 | 124 | 112 | 113 |
| INV-34 | REC-4 | yes | 4.9 | 92 | 96 | 106 | 102 | 101 |

In Table 13, the results of the radiation curable inkjet inks INK-1 to INK-5, are compared for each set of a first and a second ink receiver either without or with a surface layer with a ratio P/F of 4.9.

TABLE 13

| INK | First ink receiver | Second ink receiver | Difference in Dotsize (μm) | |
|---|---|---|---|---|
| | | | No DCF | DCF-11 |
| INK-1 | REC-1 | REC-4 | 97 | 3 |
| | REC-1 | REC-3 | 37 | 13 |
| | REC-1 | REC-2 | 55 | 16 |
| | REC-3 | REC-2 | 18 | 3 |
| | REC-3 | REC-4 | 60 | 10 |
| | REC-2 | REC-4 | 42 | 13 |
| MDD (in μm) for INK-1 = | | | 97 | 16 |
| INK-2 | REC-1 | REC-4 | 118 | 2 |
| | REC-1 | REC-3 | 70 | 7 |
| | REC-1 | REC-2 | 95 | 14 |
| | REC-3 | REC-2 | 25 | 7 |
| | REC-3 | REC-4 | 48 | 9 |
| | REC-2 | REC-4 | 23 | 16 |
| MDD (in μm) for INK-2 = | | | 118 | 16 |
| INK-3 | REC-1 | REC-4 | 137 | 1 |
| | REC-1 | REC-3 | 58 | 19 |
| | REC-1 | REC-2 | 51 | 4 |
| | REC-3 | REC-2 | 79 | 18 |
| | REC-3 | REC-4 | 7 | 15 |
| | REC-2 | REC-4 | 130 | 14 |
| MDD (in μm) for INK-3 = | | | 137 | 19 |
| INK-4 | REC-1 | REC-4 | 114 | 2 |
| | REC-1 | REC-3 | 20 | 12 |
| | REC-1 | REC-2 | 13 | 14 |
| | REC-3 | REC-2 | 7 | 2 |
| | REC-3 | REC-4 | 94 | 10 |
| | REC-2 | REC-4 | 101 | 12 |
| MDD (in μm) for INK-4 = | | | 114 | 14 |
| INK-5 | REC-1 | REC-4 | 53 | 2 |
| | REC-1 | REC-3 | 2 | 14 |
| | REC-1 | REC-2 | 2 | 14 |
| | REC-3 | REC-2 | 4 | 0 |
| | REC-3 | REC-4 | 51 | 12 |
| | REC-2 | REC-4 | 55 | 12 |
| MDD (in μm) for INK-5 = | | | 55 | 14 |

The results in Table 13 demonstrate that for each of the radiation curable inkjet inks INK-1 to INK-5, that for every set of a first and a second ink-receiver only the ink receivers provided with a surface layer exhibited differences in dotsize smaller than 30 μm. For the samples without a surface layer, at least one set of a first and a second ink-receiver was found exhibiting a difference in dotsize of at least 50 μm.

Having described in detail preferred embodiments of the current invention, it will now be apparent to those skilled in the art that numerous modifications can be made therein without departing from the scope of the invention as defined in the following claims.

We claim:

1. An ink-jet printing process comprising the steps of:
   a) providing an ink-receiver;
   b) providing a surface layer by ink-jet technology on at least a portion of said ink-receiver with a dotsize control fluid wherein the surface layer has a dry thickness between 0.1 and 10 μm;
   c) jetting at least one radiation curable ink-jet ink droplet to said surface layer on said ink-receiver;
   wherein said dotsize control fluid comprises a surfactant, a film forming polymeric resin and an inorganic filler, wherein the ratio P/F is greater than 3.0, with P being the weight % of film forming polymeric resin and F being the weight % of inorganic filler, both based on the total weight of the dotsize control fluid, and said surfactant is present in said surface layer in the range of 0.1 to 20% by weight based on the total dry weight of the surface layer and wherein the polymeric resin content in the dotsize control fluid is between 1 and 13 wt % based on the total weight of the dotsize control fluid.

2. The ink-jet printing process according to claim 1, said ink-jet printing process further comprising the steps of:
   d) providing a second ink-receiver;
   e) providing a surface layer on at least a portion of said second ink-receiver with said dotsize control fluid; and
   f) jetting at least one radiation curable ink-jet ink droplet to said surface, layer on said second ink-receiver.

3. The ink-jet printing process according to claim 2, wherein the dot size on said first ink-receiver and said second ink-receiver differs by no more than 30 μm.

4. The ink-jet printing process according to claim 2, wherein the dot size on said first ink-receiver and said second ink-receiver divided by said radiation curable ink-jet ink droplet volume differs by no more than 0.7 μm/pL.

5. The ink jet printing process according to claim 4, wherein the dotsize on said first ink-receiver and said second ink-receiver differs by no more than 30 μm.

6. A printed ink-receiver prepared in accordance with the process of claim 2.

7. The ink-jet printing process according to claim 1, wherein said inorganic filler has an average particle size smaller than 0.8 μm.

8. The ink-jet printing process according to claim 1, wherein the surface layer has a thickness between 0.1 and 5 μm.

9. The ink-jet printing process according to claim 1, wherein said dotsize control fluid is applied in an amount between 0.1 and 10 g/m$^2$.

10. The ink-jet printing process according to claim 9, wherein said at least one radiation curable ink-jet comprises less than 5 weight percent of organic solvent.

11. The ink-jet printing process according to claim 10, wherein the surface layer has a thickness between 0.1 and 5 μm.

12. The ink-jet printing process according to claim 11, wherein said inorganic filler is colloidal silica, wherein said at least one radiation-curable ink-jet ink comprises less than 20 weight percent of monofunctional monomer based on the total ink weight, and wherein said film forming polymeric resin is prepared using monomers selected from the group consisting of acrylates, methacrylates, vinyl esters, acrylic acid, methacrylic acid, itaconic acid, vinylidene chloride, polyisocyanates, aromatic polycarboxylic acids and polyols.

13. The ink-jet printing process according to claim 1, wherein said inorganic filler is colloidal silica.

14. The ink-jet printing process according to claim 1, wherein said at least one radiation curable ink-jet ink comprises less than 5 weight percent of organic solvent.

15. The ink-jet printing process according to claim 1, wherein said at least one radiation curable ink-jet ink comprises less than 20 weight percent of monofunctional monomer based on the total ink weight.

16. The ink-jet printing process according to claim 1, wherein said film forming polymeric resin is prepared using monomers selected from the group consisting of acrylates, methacrylates, vinyl esters, acrylic acid, methacrylic acid, itaconic acid, vinylidene chloride, polyisocyanates, aromatic polycarboxylic acids and polyols.

17. The ink-jet printing process according to claim 1, wherein P is no more than 11 weight percent based on the total weight of the dotsize control fluid.

18. The ink-jet printing process according to claim 17, wherein said dotsize control fluid is applied in an amount between 0.1 and 10 g/m$^2$.

19. A printed ink-receiver prepared in accordance with the process of claim 1.

\* \* \* \* \*